United States Patent Office 3,202,693
Patented Aug. 24, 1965

---

3,202,693
SUCCINATE HALF-ESTERS OF ALKYLENE GLYCOL PHOSPHATE
Van R. Gaertner, Ballwin, Mo., assignor to Monsanto Company, a corporation of Delaware
No Drawing. Filed Oct. 11, 1962, Ser. No. 230,002
6 Claims. (Cl. 260—461)

This invention relates to new and useful compounds and the process for preparing them by the reaction of phosphoric acid, an alkylene oxide, and an aliphatic succinic anhydride. This invention further relates to rust-inhibiting, detergent, and glow suppressing compositions utilizing these new compounds. The term *aliphatic* throughout the discussion and claims of this invention shall be limited to include only alkyl and alkenyl radicals.

An object of this invention is to provide new chemical compounds of the above-mentioned type.

Another object is to provide a novel process for the preparation of such new chemical compounds.

A further object is to provide novel compositions having rust-inhibiting properties and glow suppressant activity. Additional objects and advantages will become apparent from the discussion following.

Compounds according to the present invention may be represented by the following generic formula:

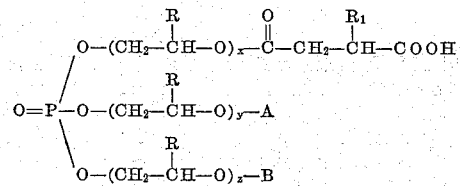

where A is selected from the group consisting of hydrogen and

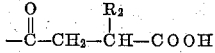

where B is selected from the group consisting of hydrogen and

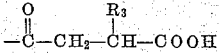

where the R's are selected from the group consisting of hydrogen and alkyl radicals preferably having from 1 to 4 carbon atoms; where $R_1$, $R_2$, and $R_3$ are selected from the group consisting of alkyl and alkenyl radicals containing up to 22 carbon atoms, preferably at least 10 carbon atoms; and where $x$, $y$, and $z$ are integers having a total value of from 3 to 9, inclusive.

The above generic formula is intended to cover the many isomers of these compounds present in minor amounts in each preparation. In the practice of this invention the alkyleneoxyl radical usually attaches to the phosphoric acid at the terminal or α-carbon atom. However, it is also possible for the addition to occur at the β-carbon atom. Similarly the isomer formed by the attachment of the unhindered carbonyl group of the succinic anhydride to the alkyleneoxyl radical is dominant in my reaction products. However there are minor amounts of isomers where one or more of the succinic acid radicals are attached at the hindered carbonyl group. Examples of such isomers include:

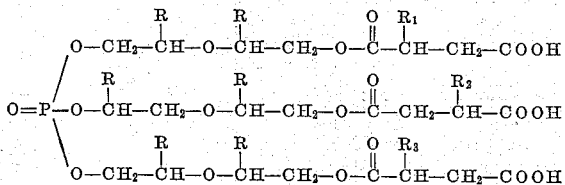

and

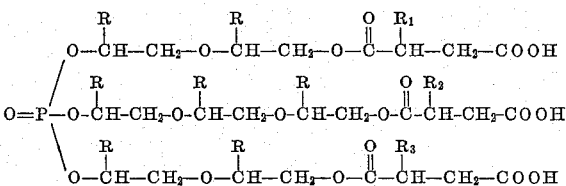

Homologues of compounds of the generic formula formed by reacting alkylene oxide mixtures with phosphoric acid are also within the scope of this invention. Such compounds would contain two or more different alkyleneoxyl groups in the same molecule. Thus for example, one can react phosphoric acid with mixtures of ethylene oxide and propylene oxide where the mixtures contain any proportion of the two alkylene oxides.

Especially useful are mixtures of compounds covered by the general formula previously given wherein the total number of alkyleneoxyl groups per molecule may vary from three to nine. The average number of such alkyleneoxyl groups for several products prepared in the course of experimentation was very nearly six. Therefore it should be noted that the designation used in naming some of the mixtures of compounds of this invention, namely, tris-(dialkyleneoxyl hydrogen aliphatic succinate) phosphate, is an approximate term descriptive of a statistical average, and not a description of individual compounds. Of course these product mixtures may be separated into individual components by techniques such as column or gas-liquid chromatography or solvent extraction. Such separated fractions are also of value in fulfilling the objects of this invention. But since the product mixtures are readily usable for the purposes of this invention, no effort need be made to separate the prepared products into their individual compounds to achieve the benefits described in this writing. For example, one of the product mixtures, tris (dipropyleneoxyl hydrogen tetrapropenylsuccinate) phosphate, is synthesized by the reaction of phosphoric acid, propylene oxide, and tetrapropenyl-succinic anhydride. The molar ratio of the reacting materials is 1:6.6:3, respectively. The product therefore contains an average of 6.6 propyleneoxyl substituents per molecule i.e., the sum total of $x$, $y$, and $z$ in the generic formula averages 6.6 for this preparation. Representative compounds of the product mixture are:

(a)
(b)
(c)

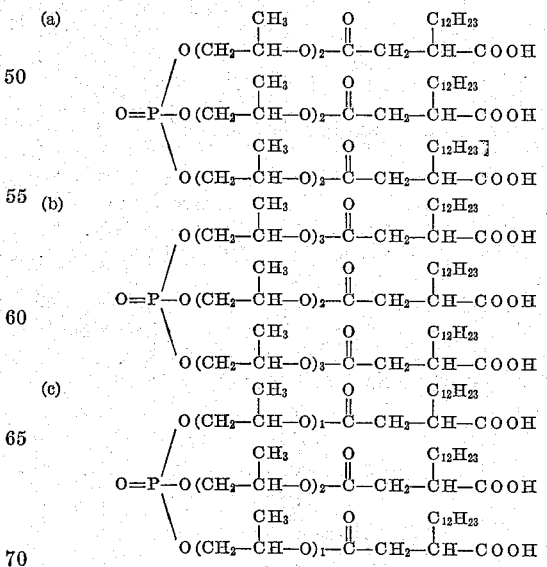

When a homologue of the above product is prepared using butylene oxide in place of propylene oxide, the ratio of the reacting phosphoric acid, butylene oxide, and tetrapropenylsuccinic anhydride is 1:5.6:3, respectively, i.e., the sum total of $x$, $y$, and $z$ in the generic formula averages 5.6 for this product mixture. Hence the term tris-(dialkyleneoxyl) indicates only an average structure of the mixtures and is used throughout the description of this invention because it is statistically illustrative of the reaction mixtures produced.

While the present invention is mainly concerned with compounds as represented by the structural formula given above, in which the succinic acid radicals contain one full carboxyl group, it also includes compounds in which the hydrogen of one or more of the carboxyl groups is replaced by a metal cation, preferably an alkali metal cation, ammonium, or amine salt cation. Such compounds are readily prepared by neutralization of the free carboxyl groups of the molecule, preferably under mild conditions. Esterification of these same free carboxyl groups can also be utilized to prepare compounds of comparable activity and increased solubility. Amido and imido derivatives are likewise suitable and find utility in some applications within the scope of this invention.

The compounds according to this invention are prepared in a two-step process. The first step involves the preparation of a phosphoric acid-alkylene oxide adduct. This is accomplished by reacting phosphoric acid with an organic oxide of the general formula

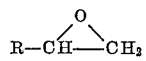

where R is selected from the group consisting of hydrogen and alkyl radicals preferably containing from 1 to 4 carbon atoms. Although not an essential requirement, the reaction is preferably carried out in an inert atmosphere of moisture-free nitrogen. The reaction of the above components is highly exothermic and requires that some means be employed to maintain the temperature at a safe level. A suitable method which I have found effective involved the dropwise addition of the alkylene oxide with stirring combined with a cooling of the reaction flask to maintain the temperature at a desired level. In my experimentation I adopted a maximum of 40° C.; however higher or lower temperatures can be used. This reaction is virtually complete immediately after completion of addition of the alkylene oxide but it may be desirable to allow the reaction mixture to stand unattended for several hours with an excess of the alkylene oxide present, particularly if an adduct containing the maximum number of alkyleneoxyl groups is desired. After purification this intermediate is then reacted with an aliphatic succinic anhydride to form the compounds of this invention. Suitable operating temperatures for this step extend beyond 180° C. with temperatures around 80–120° C. normally being employed. This reaction usually requires about an hour to go to substantial completion, particularly if a solvent such as dimethylformamide and a catalyst such as DABCO (triethylenediamine manufactured by Houdry Process Corporation) are used. Of course the reaction can be carried out without a solvent or catalyst but higher temperatures would then be required and the reaction would require a longer period of time for completion.

More specifically one of the products, tris-(dipropyleneoxyl hydrogen n-octadecenylsuccinate) phosphate, is prepared by combining 6.6 moles of propylene oxide with one mole of phosphoric acid to form a product of this type:

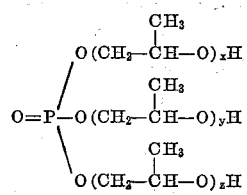

where $x$, $y$, and $z$ are integers having a total average value of 6.6. This intermediate is then reacted with n-octadecenylsuccinic anhydride to produce the desired product:

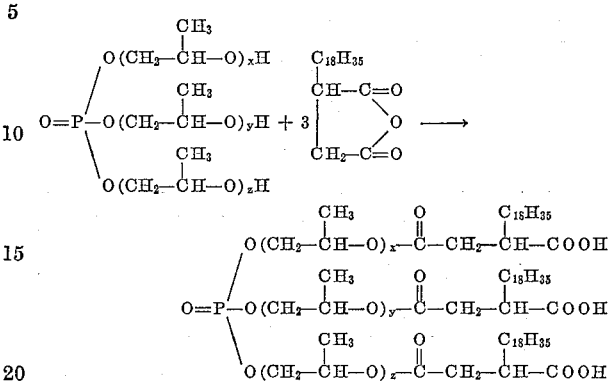

The following examples will serve to illustrate the present invention.

EXAMPLE I

A quantity of 39.2 grams (0.40 mole) of 100% $H_3PO_4$ was introduced into a system containing a dry nitrogen atmosphere. The acid was stirred vigorously and 199.5 grams (3.44 moles) of propylene oxide was added dropwise. The reaction was exothermic but the temperature of the reaction vessel was held at 30–40° C. during the entire reaction by cooling as necessary. Toward the end of the addition, the temperature started to fall regardless of the rate of addition of the propylene oxide until it reached 31° C. at the end of the addition. The mixture was allowed to stand at room temperature overnight. Volatile components in the reaction vessel were removed first by aspiration at room temperature. The product was then heated for one hour at 55–60° C. and 19 mm. and finally for one hour at 85–90° C. and 0.5 to 1.0 mm. The product was a nearly colorless (very slightly cloudy), viscous liquid. Properties of the product included: acid number 0.88; $n_D^{25}$ 1.4528; weight percent hydroxyl radicals 11.32%, calculated 10.54% for three hydroxyl groups. Product yield was 193.5 grams. Tests showed that all the $H_3PO_4$ had reacted; hence 154.3 grams of propylene oxide was utilized. The mole ratio of reacted propylene oxide to $H_3PO_4$ used was 6.65 to 1.

To 24.2 grams (0.050 mole) of the above product was added 26.6 grams (0.10 mole) of tetrapropenylsuccinic anhydride (TPSA). The mixture was stirred and heated for approximately seven hours with the temperature being raised gradually from an initial temperature of 24° C. to a final temperature of 117° C. After one hour approximately 0.5 gram of DABCO was added as a catalyst. About midway through the preparation, 13.3 grams of TPSA was added to the reaction flask to bring the total weight of TPSA to 39.9 grams (0.15 mole). This is equivalent to a 3:1 mole ratio of TPSA to the phosphoric acid-propylene oxide adduct. To the final product 50 ml. of dimethylformamide was added and the mixture was refluxed for two hours. The dimethylformamide was then distilled off, the last traces being removed by heating and stirring at 100° C. and 0.5 to 1.0 mm. The residue was an amber-red gummy oil insoluble in cold hexane but soluble in hot hexane. A solution prepared by dissolving the product in hot hexane remained homogeneous when cooled. Product yield was 66.8 grams; neutralization equivalent $$\frac{(\text{mol. wt.})}{(\text{No. of —COOH})}$$

was 418; calculated: 427 for three carboxyl groups per mole.

The product is tris-(dipropyleneoxyl hydrogen tetrapropenylsuccinate) phosphate.

EXAMPLE II

To 14.5 grams (0.033 mole) of the phosphoric acid-propylene oxide adduct (prepared as described in Example I) was added 35.1 grams (0.10 mole) of n-octadecenylsuccinic anhydride with 0.5 gram of DABCO catalyst and 50 ml. of dimethylformamide. The mixture was stirred and heated to 100°–110° C. for one hour. Volatile components were distilled off by heating and stirring at 100° C. and 0.2 mm. The residue was a clear orange oil which solidified to a wax at room temperature. This residue was soluble in cold hexane. Product yield was 50.3 grams; neutralization equivalent was 496; calculated: 512 for three carboxyl groups per mole.

The product is tris-(dipropyleneoxyl hydrogen n-octadecenylsuccinate) phosphate.

EXAMPLE III

A quantity of 19.6 grams (0.20 mole) of 100% $H_3PO_4$ was introduced into a system containing a dry nitrogen atmosphere. The acid was stirred vigorously and 115.0 grams (1.6 moles) of 1,2-butylene oxide was added dropwise over a period of two hours. The reaction was exothermic but the temperature was maintained at 30–40° C. during the entire reaction by cooling as necessary. The mixture was stirred overnight for a total reaction time of approximately nineteen hours. Excess butylene oxide was removed by aspirating, stirring and heating the mixture to 45° C. at 0.2 mm. The product was a light yellow clear oil. Properties of the product included: acid number 1.36; $n_D^{25}$ 1.4547; weight percent hydroxyl groups 10.25%, calculated 10.12% for three hydroxyl groups. Product yield was 100.9 grams. Tests showed that all the $H_3PO_4$ had reacted. Hence 81.3 grams (1.13 moles) of butylene oxide was used. The mole ratio of reacted butylene oxide to $H_3PO_4$ used was 5.64 to 1.

To 15.1 grams (0.030 mole) of the above product was added 24.0 grams (0.090 mole) of TPSA with 0.5 gram DABCO catalyst and 50 ml. of dimethylformamide. The mixture was stirred and heated to 100–115° C. for one hour. Volatile components were removed by aspiration and heating at 100° C. and 0.2 mm. The residue was a light amber, highly viscous oil soluble in cold hexane. Product yield was 39.8 grams; neutralization equivalent was 407; calculated: 434 for three carboxyl groups per mole.

The product is tris-(dibutyleneoxyl hydrogen tetrapropenylsuccinate) phosphate.

Among other applications, the compounds of this invention are useful as petroleum additives. The petroleum products which can be improved by this invention include low boiling fractions of mineral oil in the gasoline range boiling about 100–250° C. and the fuel oil range boiling about 250–350° C. Furthermore, in some cases, it may be desirable to add the materials herein to a crude mineral oil or to lubricating oils to take advantage of their desirable properties. In utilizing these compounds as additives, amounts required for effective activity vary depending upon which properties are desired and which compound is being used. Generally concentration levels may run from 2 to 200 parts per million. It will seldom be necessary to employ more than 1% by weight as an additive, but it may be advantageous to prepare concentrates of up to 50% by weight for convenient metering into the petroleum products. As additives, these compounds are active as rust inhibitors, glow suppressants, and detergents in varying degrees, depending upon which particular compound is being used.

To test the rust-inhibiting properties of the prepared compounds, ASTM procedure D–665–60 was employed. Table I below lists the data obtained and provides a comparison between compounds of this invention and commercial additives presently available. The numerical system used to rate the effectiveness of these compounds as rust inhibitors is as follows:

0: Test plate completely rusted.
5: 32 rust spots on test plate.
10: No rust spots on test plate.

Other rating numbers indicate conditions of the test plate intermediate between conditions described above. For comparison purposes a fuel containing no rust inhibitor gives ratings of 3–4 after one hour of testing and 0–1 after twenty-four hours of testing. One modification for ASTM D–665–60 was adopted—a testing temperature of 80° F. was used instead of the 140° F. temperature specified in the procedure.

Table I
ASTM D–665–60 RUST TEST (PROCEDURE A)

| Rust inhibitor | Additive concentration in lbs. per 1,000 bbls. | | | |
|---|---|---|---|---|
| | 30 lbs./1,000 bbls. | 25 | 20 | 10 |
| Ethyl MPA | | | 7 | 2.5 |
| Texaco 2003 | 8 | | | |
| Compound A | | 9 | | |
| Compound B | | 9 | | |
| Compound C | | 10 | 10 | 10 |

Compound A = tris-(dibutyleneoxyl hydrogen tetrapropenylsuccinate) phosphate.
Compound B = tris-(dipropyleneoxyl hydrogen tetrapropenylsuccinate) phosphate.
Compound C = tris-(dipropyleneoxyl hydrogen n-octadecenylsuccinate) phosphate.

In addition to rust inhibition, certain compounds of this invention possess a detergency action or an ability to disperse accumulated sludge in a system. One such compound found to possess a detergency action was tris-(dipropyleneoxyl hydrogen n-octadeceneylsuccinate) phosphate.

Compounds of this invention are active as glow suppressants, i.e., they have the ability to raise the temperature at which carbon deposits start to glow. Depending upon the particular combination of carbon side-chains, these compounds have a greater or lesser activity than tricresyl phosphate (TCP). For example, based upon the weight of phosphorus in the fuel, tris-(dibutylenexoyl hydrogen tetrapropenylsuccinate) phosphate is more active than TCP as a glow suppressant; tris-(dipropyleneoxyl hydrogen n-octadecenylsuccinate) phosphate is equally as active as TCP; and tris-(dipropyleneoxyl hydrogen tetrapropenylsuccinate) phosphate is less active than TCP.

From the above discussion it is apparent that the effectiveness of the compounds of this invention regarding these areas of activity is dependent upon the variation of the carbon side-chains designated R, $R_1$, $R_2$, and $R_3$ in the generic formula. By proper combinations of these side-chains it is possible to prepare compounds possessing high degrees of activity as rust inhibitors, glow suppressants, and sludge dispersants.

What is claimed is:
1. A compound of the formula:

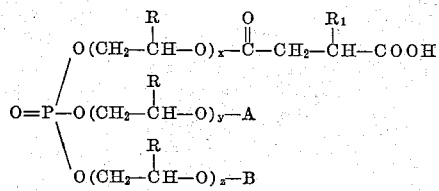

where the R's are selected from the group consisting of hydrogen and alkyl; where A is selected from the group consisting of hydrogen and

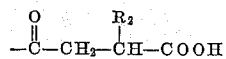

where B is selected from the group consisting of hydrogen and

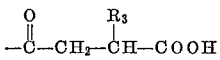

where $R_1$, $R_2$, and $R_3$ are selected from the group consisting of alkyl and alkenyl having from 10 to 22 carbon atoms; and where $x$, $y$, and $z$ are integers having a total value of from 3 to 9.

2. A compound of the formula:

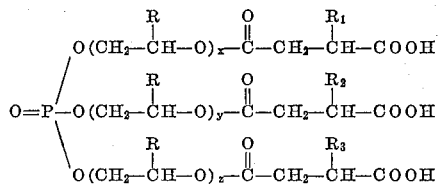

where the R's are selected from the group consisting of hydrogen and alkyl; where $R_1$, $R_2$ and $R_3$ are selected from the group consisting of alkyl and alkenyl having from 10 to 22 carbon atoms; and where $x$, $y$, and $z$ are integers having a total value of from 3 to 9.

3. A compound of claim 2 wherein the R's are alkyl having up to 4 carbon atoms.

4. A mixture of compounds of claim 2 wherein the R's are methyl; $R_1$, $R_2$ and $R_3$ are tetrapropenyl; and $x$, $y$, and $z$ are integers having a total average value of from 6 to 7 for the mixture.

5. A mixture of compounds of claim 2 wherein the R's are methyl; $R_1$, $R_2$ and $R_3$ are n-octadecenyl, and $x$, $y$, and $z$ are integers having a total average value of from 6 to 7 for the mixture.

6. A mixture of compounds of claim 2 wherein the R's are ethyl; $R_1$, $R_2$, and $R_3$ are tetrapropenyl; and $x$, $y$, and $z$ are integers having a total average value of from 5 to 6 for the mixture.

References Cited by the Examiner

UNITED STATES PATENTS

| | | | |
|---|---|---|---|
| 2,830,069 | 4/58 | Smith | 260—461 |
| 2,844,450 | 7/58 | Heisler et al. | 44—70 |
| 2,911,309 | 11/59 | Rudel et al. | 106—14 |
| 2,937,933 | 5/60 | Heisler et al. | 44—70 |
| 2,958,603 | 11/60 | Sheldahl | 106—14 |
| 3,061,625 | 10/62 | Friedman | 260—461 |

CHARLES B. PARKER, *Primary Examiner.*

IRVING MARCUS, *Examiner.*